Figure 1:
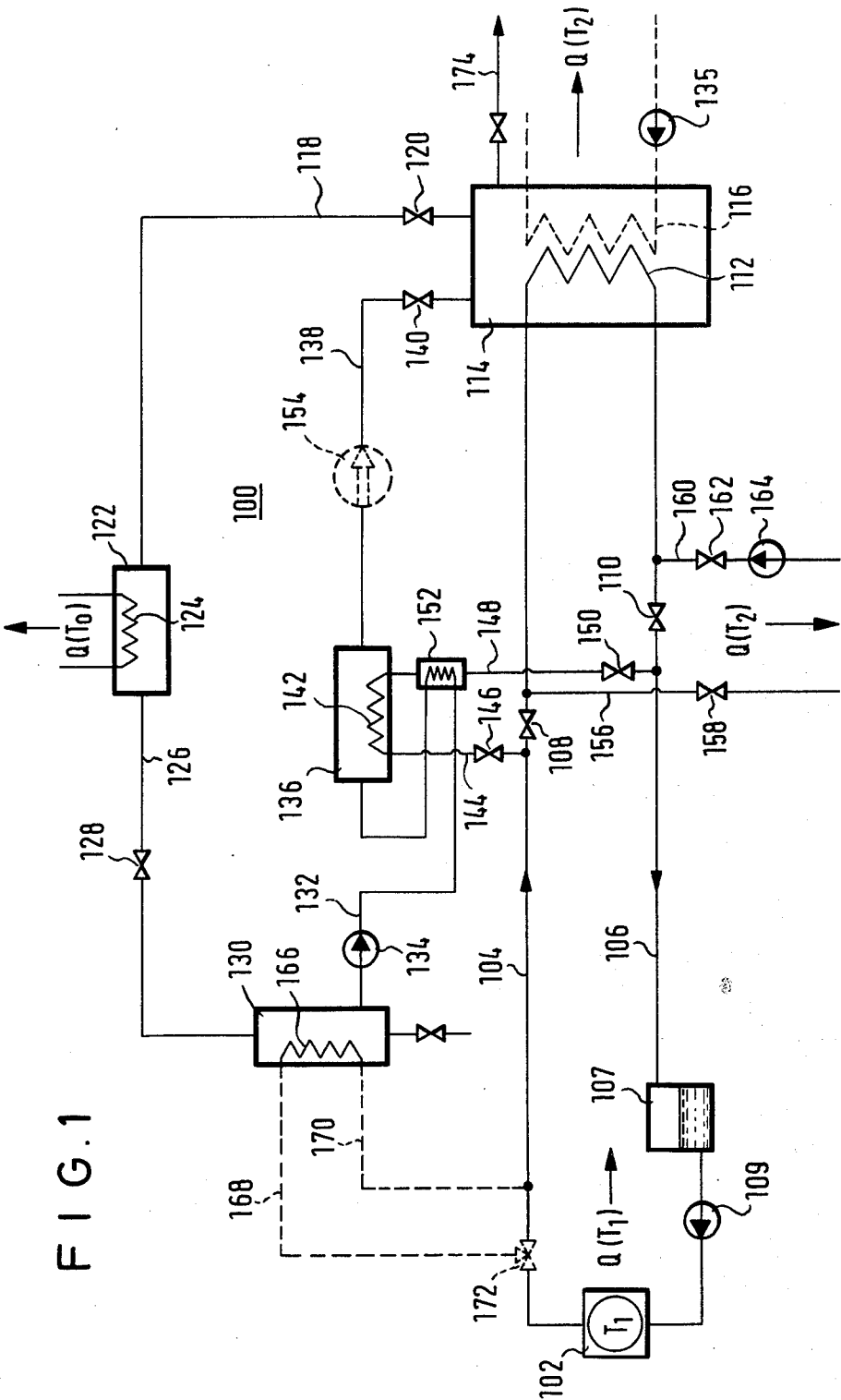

United States Patent [19]

Alefeld et al.

[11] 4,410,028

[45] Oct. 18, 1983

[54] PROCESS AND INSTALLATION FOR STORING HEAT AND FOR UPGRADING ITS TEMPERATURE

[75] Inventors: Georg Alefeld, Josef-Raps-Strasse 3, Munich 40, Fed. Rep. of Germany; Peter Maier-Laxhuber, Munich; Markus Rothmeyer, Erding, both of Fed. Rep. of Germany

[73] Assignee: Georg Alefeld, Munich, Fed. Rep. of Germany

[21] Appl. No.: 272,185

[22] Filed: Jun. 10, 1981

[30] Foreign Application Priority Data

Jun. 13, 1980 [DE] Fed. Rep. of Germany ....... 3022284

[51] Int. Cl.³ .............................................. F25B 15/00
[52] U.S. Cl. ................................... 165/1; 165/104.12; 62/112; 62/480
[58] Field of Search .................. 165/104.12, DIG. 17; 60/673; 62/112, 480

[56] References Cited

U.S. PATENT DOCUMENTS 4,138,861 2/1979 Jaroslav ................................ 62/480
4,321,799 3/1982 Pierotti et al. ........................ 62/112
4,327,553 5/1982 Rilett ..................................... 60/673

FOREIGN PATENT DOCUMENTS 2029908 3/1980 United Kingdom ................. 60/673

Primary Examiner—Albert W. Davis, Jr.
Attorney, Agent, or Firm—Kinzer, Plyer, Dorn & McEachran

[57] ABSTRACT

Process for storing heat and for upgrading its temperature, in which a working substance is expelled from an absorbing substance by means of heat of a predetermined intermediate temperature range, the vapor of the working substanced generated during the expulsion step being condensed at a comparatively low temperature and the condensed working substance being evaporated in the intermediate temperature range and being absorbed in the absorbing substance under an increased pressure and at a relatively high temperature while generating heat of absorption, in which a zeolite is used as the absorbing substances and water is used as the working substance.

25 Claims, 7 Drawing Figures

PROCESS AND INSTALLATION FOR STORING HEAT AND FOR UPGRADING ITS TEMPERATURE

The present invention relates to a process for storing heat energy and upgrading or transforming the temperature thereof. The invention additionally relates to installations for carrying out a process of this type.

The term "heat-upgrading system" or heat transformer is used for installations which are fed with input heat at intermediate temperature levels, and which deliver useful heat or output heat at a higher temperature level, as well as waste heat at a lower temperature level. These terms will also be employed in the present text, in the sense indicated.

A heat-upgrading system, operated continuously, has already been discussed by K. Nesselmann in the publication "Zur Theorie der Wärmetransformation [Concerning the theory of the upgrading of heat]", a scientific publication by the Siemens Group of Companies 12 (1933), No. 2, pages 89–109. Heat-upgrading systems which operate continuously are additionally known from German Auslegeschrift No. 1,020,997, as well as from the German Offenlegungsschriften No. 2,554,937, 2,629,441, 2,635,557 and 2,727,990.

The heat-upgrading system according to German Offenlegungsschrift No. 2,554,937 is intended for the purpose of raising the waste heat of a power station to a higher temperature level. $NH_3$ is employed as the working substance.

The heat-upgrading system known from German Offenlegungsschrift No. 2,635,557 operates with the working-substance system $NH_3/H_2O$/propane.

Heat-upgrading systems which operate intermittently ("periodic operation") are also known, from for example, German Offenlegungsschriften No. 2,629,441, 2,758,727 and 2,808,464.

The heat-upgrading system known from German Offenlegungsschrift No. 2,629,441 is intended for the purpose of power-generation, it being necessary to store large quantities of ammonia. A heat-upgrading system operated as a multi-stage storage device is indicated in German Offenlegungsschrift No. 2,758,727, but not more detailed information is provided with regard to how the operation should be carried out. $Na_2S$ is employed as the storage medium, this substance being hazardous and incapable of allowing temperatures above 80° C. The heat-upgrading system described in German Offenlegungsschrift No. 2,808,464 comprises a specifically designed combination of two storage devices which are operated intermittently, this system being employed for storing and upgrading solar heat, from 35° C. to approximately 70° C. It is intended to employ methylamine as the working substance, this compound not only being poisonous but also decomposing easily. $CaCl_2$ and $LiCl$ are designated as the storage substances or absorption substances. The installations indicated are very complicated and require many heat-exchangers, thereby impairing the efficiency.

In addition, metal hydrides could be employed as a working-substance system. However, the working-substance system metal/hydrodgen can be employed only in the case of a heat-upgrading system which operates according to the resorber principle, this mode of operation being associated with considerable technical effort. Moreover, a certain explosion hazard always exists when hydrogen gas is used, and the swelling of the hydride while taking up hydrogen entails problems which can be solved only with difficulty on an industrial scale.

Heat-upgrading systems, sometimes called heat transformers, are needed for many purposes: the supply of heat and the generation of power are often coupled together, in the case, for example, of combined heating and power stations, in the case of diesel engines and gas engines which drive generators or compressor heat pumps, the waste heat from these engines being utilised, and in the case of supplying process heat for example in the chemical industry and in the foodstuffs industry. Efficient heat-storage devices are needed, on the one hand, on account of the very dissimilar time-related structuring of the demands for heat and power. On the other hand, the temperature level of the heat which is available must commonly be raised in order to be able to utilise this heat. For example, combined heating and power stations are generally operated at optimum efficiency with respect to the generation of electricity, this mode of operation implying that the waste heat should be produced at a temperature level which is as low as possible. In contrast, in the case of supplying heat from a remote central station (district heating station), the initial temperature of the heat-transfer medium must have a certain minimum value which rises as the demand for remote heating increases. For the case in which the waste heat of the power station is fed directly into the remote-heating supply system, this requirement can be satisfied only at the expense of the efficiency of the power station. A storage device which, during peak demand on the remote-heating supply system, delivers heat at a level which is higher than the charging level (charging at night, for example, at 100° C., and heat delivery at 130° to 150° C. at times of peak load) would thus give rise to a considerable improvement in the overall efficiency of the thermal power station and of the remote-heat supply.

In the case of combined heating and power stations employing gas engines and diesel engines, heat is released in the power-plant cooling circuit at 80° C. to 100° C. This temperature level is often too low for a remote-heating supply system, or for process heat, since initial temperatures of between 120° and 150° C. are frequently needed for these types of system. In such cases, a storage device is also needed, this device not only providing compensation for fluctuating demand, but additionally being capable of delivering the heat at a higher temperature level than that at which it was stored.

In the case of municipal remote-heating supply systems for meeting the demand for domestic heating, as well as in the case of supplying heat from remote stations for industrial use, the initial temperature must be raised during times of peak load, in order to enable the demand for heat to be completely met. A higher initial temperature does not, however, lead only to a poorer efficiency in the case of the power-generation, but also to higher losses in the lines forming the remote-heating supply system. In such cases, a remedy could be provided by a heat-storage device installed at the location of the consumer, this device being charged during periods of low demand for heat and delivering output heat at times of high load, the latter heat having a temperature which is higher than that of the input heat employed for the charging operation. Not only would the raising of the initial temperature of the remote-heating supply system thereby become completely or at least partially superfluous, but the capital investment in the remote-heating supply system would also decrease, since this system is loaded more uniformly. Such storage devices could be located at supply system pipeline-intersections, or directly at the individual consumers, and they could be charged with heat from either the outward-flow pipeline and/or from the return-flow pipeline.

In industry, waste heat often occurs which can no longer be utilised, since it has too low a temperature, and/or is not needed at the time it is produced, and/or is not needed at the place were it is produced. Heat-upgrading systems which operate intermittently can also be advantageously employed in these cases, for storing heat, for upgrading the temperature level and, if appropriate, for transporting heat.

In all the cases mentioned, in particular for heat-upgrading and storage systems which are located in the vicinity of consumers, in, for example, dwelling houses, workshops and offices, it is absolutely necessary that the working-fluid system employed consists of substances which are non-hazardous and harmless to the environment. At the same time, the nature of these substances must be such that output heat or useful heat can be generated at a relatively high temperature level, for example 100° to 150° C., or even 200° to 250° C.

The object underlying the present invention is thus to indicate a heat-upgrading and storage system comprising a heat transformer system which operates, in contrast to the state of the art, with environmentally harmless and non-hazardous substances and which, in further contrast to the state of the art, is also capable of delivering output temperatures or useful heat temperatures higher than 100° C., in particular output temperatures above 150° C. to 250° C., or even 300°.

This object is achieved, according to the invention, broadly speaking, by using water as the working fluid, in conjunction with zeolite as an absorption or storage substance, in a heat storing and heat forming or heat upgrading system comprising a heat transformer system which receives heat at at least one intermediate temperature level and delivers heat at a more useful, relatively higher temperature level (and waste or low grade heat at a relatively lower temperature level).

The system employing zeolite as an absorption substance and water as a working fluid is consequently employed in the process and installations according to the invention. This system is harmless to the environment and non-poisonous, so that no expensive safety precautions are required and the use of this system is even possible in areas accessible to the public. Moreover, precisely this water/zeolite system according to the invention possesses the advantage that the temperatures which are desired for the useful heat, of at least 130° C., in particular above 150° C. to 250° C. and, under some circumstances, even up to 300° C. and above, can be achieved with good efficiency.

Hitherto, the use of a combination water and zeolite system has been known only in the case of a cooling unit operated with low-temperature heat, such as solar heat (U.S. Pat. No. 4,034,569) and for solar energy storage (Solar Energy, Vol. 23, pp. 489-495). The processes indicated in these publications do not, however suggest the use of the combination of zeolite and water in a heat-upgrading system for generating useful heat at a relatively high temperature level.

Figure 2:
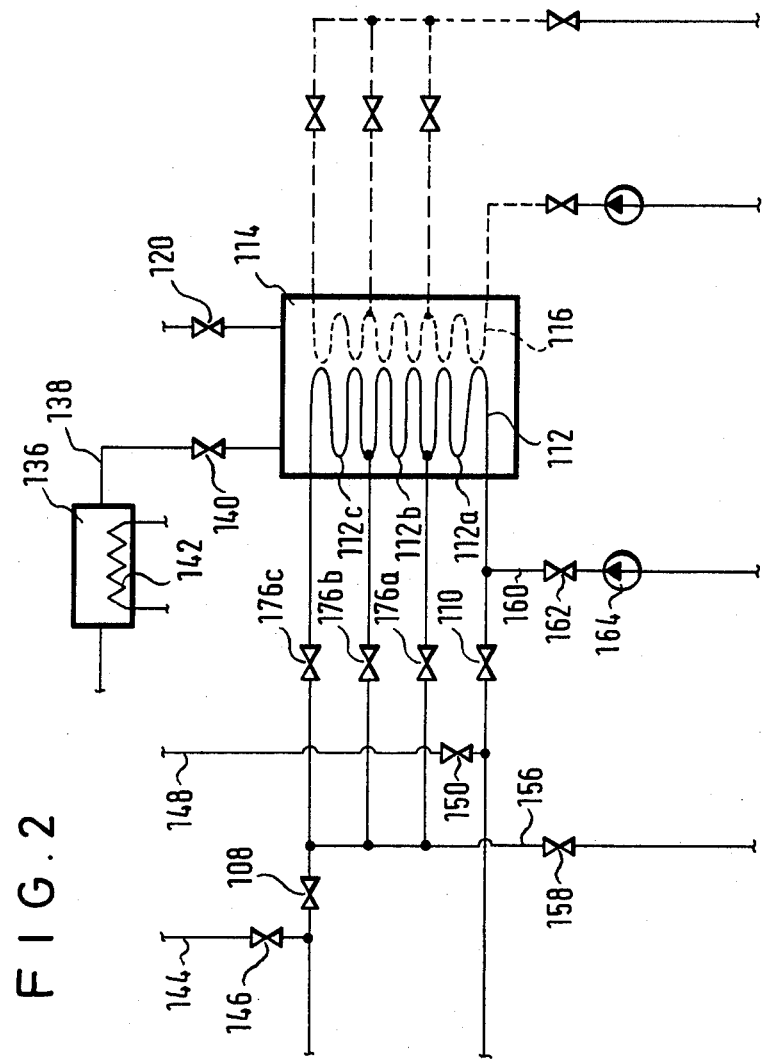
Figure 3:
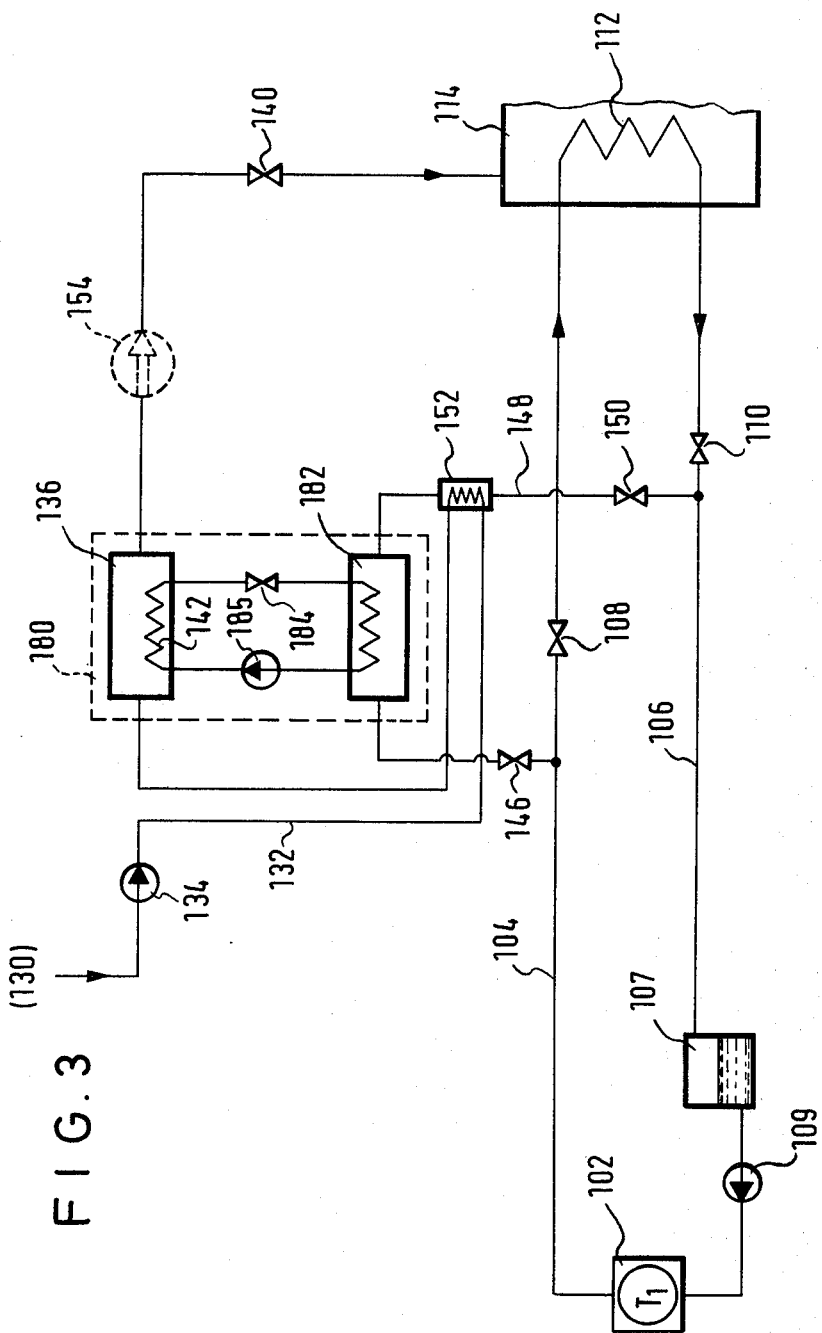
Figure 4:
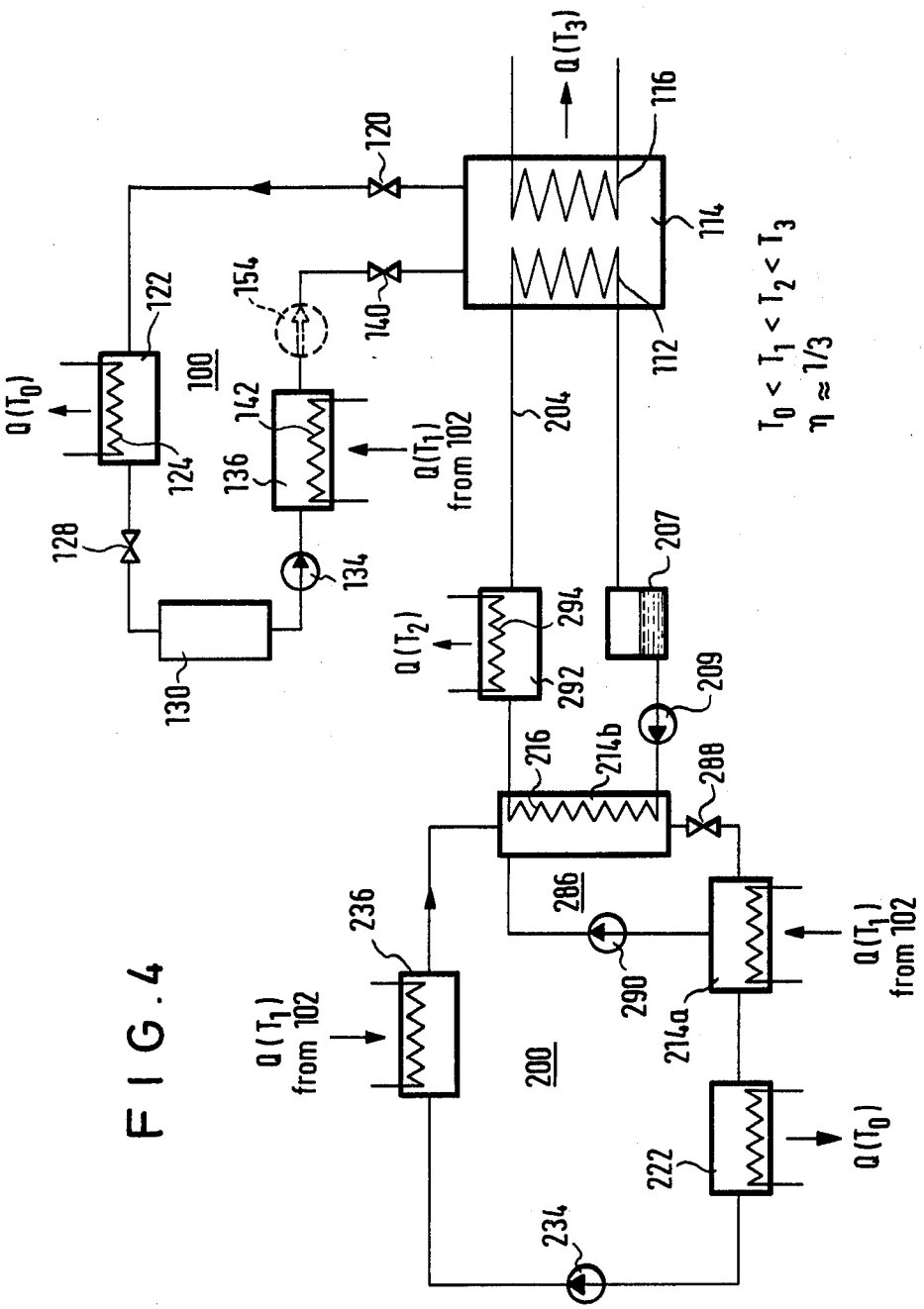
Figure 5:
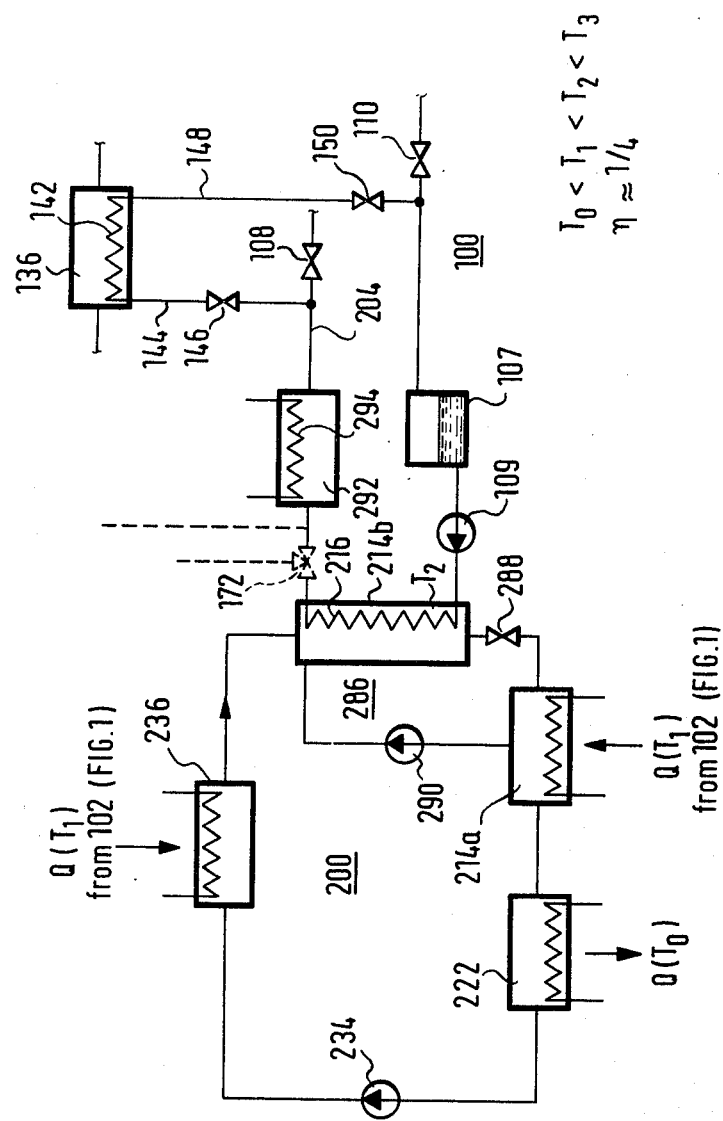
Figure 6:
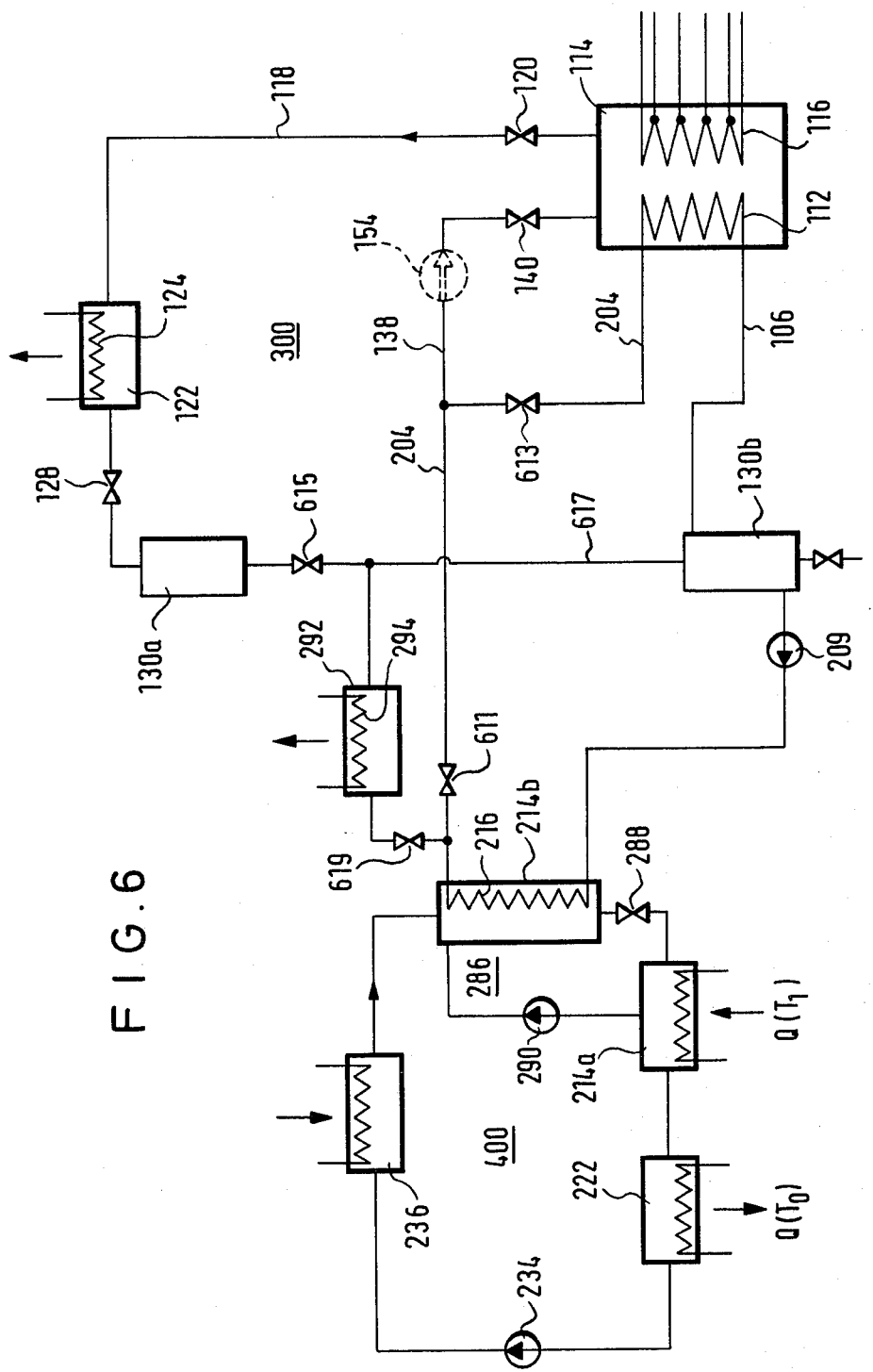
Figure 7:
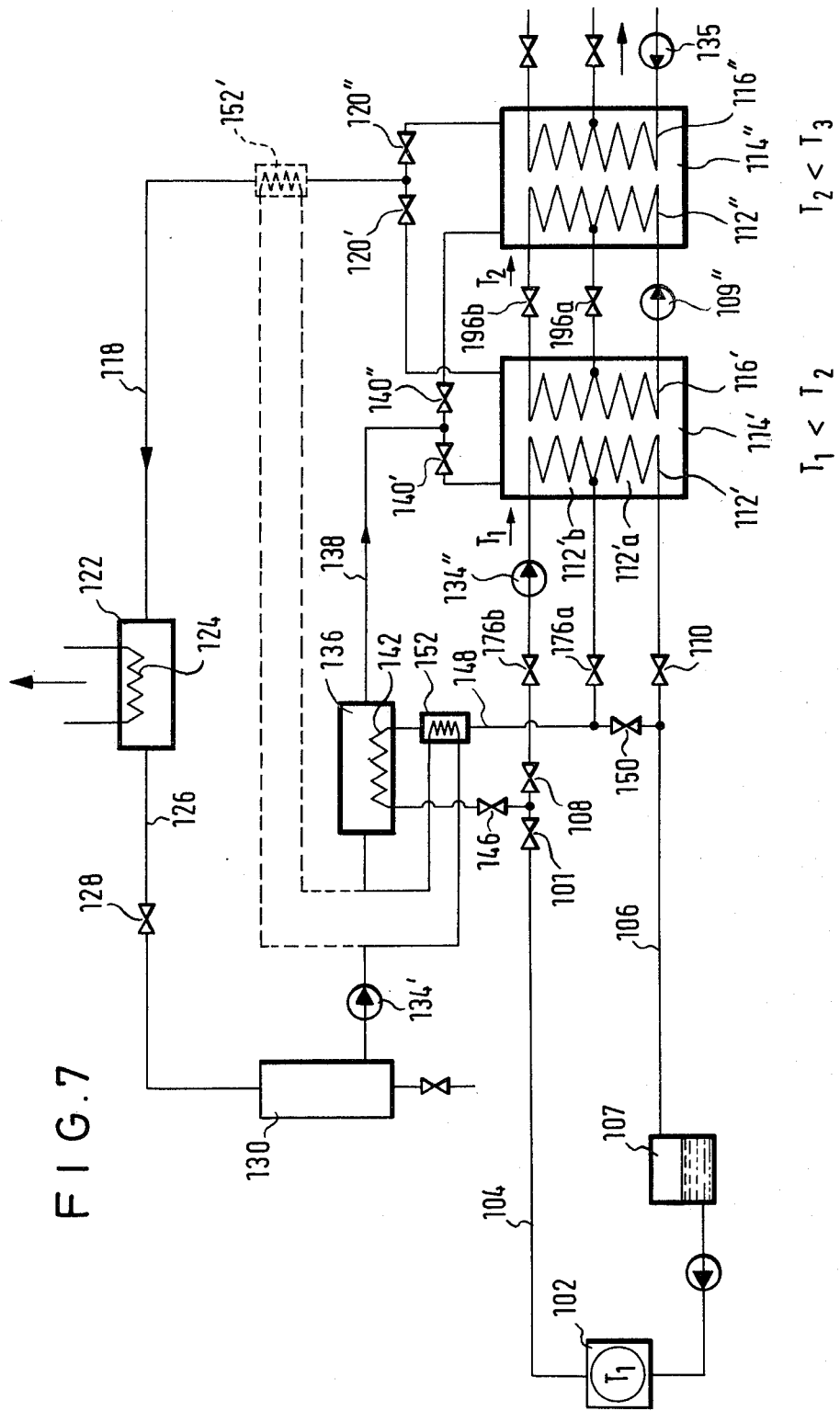

In the following text, illustrative embodiments of the invention are explained in greater detail with reference to the drawing, in which:

FIG. 1 shows a single-stage heat-upgrading system having various devices for improving the efficiency, this system operating according to the process according to the invention, FIG. 2 shows a device for abstracting heat from a storage device of the heat-upgrading system according to FIG. 1, FIG. 3 shows an installation comprising a heat-upgrading system which operates intermittently, in combination with a compressor heat pump, FIGS. 4, 5 and 6 show embodiments of heat transformer installations operating according to the process according to the invention, comprising a heat-upgrading system which operates continuously, in combination with a heat-upgrading system which operates intermittently, and FIG. 7 shows an installation operating according to the process according to the invention, this installation comprising two heat-upgrading systems which operate intermittently.

A single-stage heat-upgrading system 100 is shown diagrammatically in FIG. 1, input heat being fed to this system from a heat source 102. The input heat can be contained in the exhaust steam from a steam turbine unit, in a fluid which has been heated up by the waste heat of a gas turbine process, or in the heat-transfer medium of an outward-flow pipeline or return-flow pipeline of a remote-heating system, in a heat-transfer medium which has been warmed up by the waste heat of an engine or of an industrial process, or in a heat-transfer medium which has been heated up by means of concentrated solar heat (solar furnace). The input heat from the heat source 102 is fed, via a circuit around which a heat-transfer medium circulates, to a heat-storage device 114, the circuit containing a heat-exchanger element 112 which is contained in the heat-storage device 114, this heat-exchanging device being represented as a heat-exchanger coil for the sake of simplicity, but can in practice be, for example, a fin- or lamella-type heat-exchanger, or similar. This possibility also applies in the case of the other heat-exchanger elements which are represented in the drawings as heat-exchanger coils.

In addition, two shut-off valves 108, 110 are located in the circuit around which a heat-transfer medium circulates, and, on employing a heat-transfer medium which is initially in the form of vapour and condenses in the heat-exchanger coil 112, such as steam, a storage vessel 107 is also located in the circuit, as well as a feed-pump 109, which conveys the heat-transfer medium back to the heat source 102.

The heat-storage device 114 generator/absorber contains a zeolite as absorbing substance and advantageously contains $H_2O$ as the working fluid. The temperature of the heat-transfer medium in the heat-exchanger coil 112 can lie in the order of magnitude of 100° C., for example between 80° and 110° C. In addition, the heat-storage device 114 can contain a heat-exchanger coil 116, through which a heat-transfer medium is fed for the purpose of abstracting the output heat or useful heat. The heat-exchanger coil 116 can, for example, deliver heat to a remote-heating supply system.

A working fluid output line 118 is connected to the heat-storage device 114, this line containing a valve 120 and leading to a condenser 112, which operates at a relatively low temperature and contains a heat-exchanger 124, via which the waste heat produced in the condensation process is led off to a cooling tower, a river or the like. The condensed working fluid, which advantageously consists of water, then flows, via a line 126, containing a valve 128, into a storage vessel 130. The storage vessel 130 is connected, via a line 132, containing a pump 134, to the input of an evaporator 136, the output of this evaporator being connected, via a working fluid input line 138, containing a shut-off valve or non-return valve 140, to a working fluid input of the heat-storage device 114.

The evaporator 136 contains a heating-coil 142, which comprises an input line 144, having a valve 146, and an output line 148, having a valve 150. The input line 144 and the output line 148 are respectively connected to the portions of the lines 104 and 106 which are located between the heat source 102 and the valves 108 and 110.

In order to increase the efficiency, the line 132 can lead through a heat-exchanger 152 which is connected into the output line 148.

The working-fluid input line 138 can contain a compressor 154.

The portions of the lines 104 and 106 which are respectively located between the heat-exchanger coil 112 and the valves 108 and 110 can be respectively connected to a line 156, containing a valve 158, and to a line 160, containing a valve 162 and a circulating pump 164. By this means, the useful heat can also be abstracted via the heat-exchanger coil 112. In this case, the heat-transfer circuit leading through the heat source 102, and the heat-transfer circuit containing the lines 156, 160, must, of course, contain the same heat-transfer medium for abstracting the useful heat.

The valve settings, pump operating conditions, temperatures and pressures for the operation of the installation represented in FIG. 1 during the charging and the discharging of the heat-storage device 114 are indicated in Table 1.

In the charging operation, heat from the heat source 102, at a temperature level $T_1$ (for example 60° to 130° C.) is fed into the heat-storage device 114 by means of a heat-transfer fluid which can, for example, be liquid $H_2O$, via the heat-exchanger coil 112. In the completely or partially discharged condition, the heat-storage device contains, as a storage medium, a zeolite which is charged with water. By the feeding-in of heat, water vapour is expelled from the zeolite, this vapour flowing via the line 118 into the condenser 122, where it is condensed, and collected in the storage vessel 130. The heat-exchanger 124 can be connected into a separate circuit, which contains a cooling device operating with river water or ambient air, and working with, for example, $NH_3$, or with a fluorocarbon, such as $CCl_2F_2$ or $CHClF_2$, or the like, as heat-transfer medium.

In the operation of discharging the heat-storage device 114, that is to say during the generation of output heat or useful heat, water is delivered into the evaporator 136 by means of the pump 134, and is there evaporated by means of heat from the heat source 102. The water vapour, which is formed at a relatively high pressure corresponding to the temperature of the heat source 102, is absorbed in the zeolite in the heat-storage device 114. The heat of absorption which is generated during this process is led to the consumer via the heat-exchanger coil 112, by means of the heat-transfer fluid delivered by the pump 164. If the heat-transfer circuit for the useful heat is operating with a heat-transfer fluid which is immiscible with the heat-transfer fluid from the heat source 102, the useful heat is abstracted via the heat-exchanger 116.

The pressure of the working fluid, which has a value $p_0$ (for example 0.01 bar) in the storage vessel 130, corresponding to the condenser temperature $T_0$, is increased, by means of the pump 134, to a value $p_1$ (for example 1 bar) in the evaporator 136, corresponding to the temperature $T_1$ of the heat source 102. By this means, the absorption of the working-fluid vapour in the zeolite is effected at a correspondingly high pressure and the heat of absorption is accordingly liberated at the high temperature desired.

It is advantageous to heat the working fluid which is delivered from the collecting vessel 130 by means of the pump 134, before entry into the evaporator 136. This heating is expediently effected by means of the heat-exchanger 152, which is connected into the return-flow line 148 of the heat-transfer medium from the heat source 102. As a result of the preheating of the working fluid fed into the evaporator 136, a higher average temperature and thus a higher vapour pressure are achieved in the evaporator 136, which in turn causes the temperature level of the useful heat in the storage device 114 to be raised, and also results in an increase in the range of vapour absorption, thereby increasing the efficiency of the zeolite in the storage device 114.

When the useful heat is abstracted from the generator/absorber 114, the heat-transfer medium flow in the heat-exchanger coils 112 and/or 116, advantageously in the opposite direction to the heat-transfer medium in the heat-exchanger coil 112 during the operation of charging the storage device.

An additional advantageous further development of the installation according to FIG. 1 consists of providing a heat-exchanger coil 166 in the storage vessel 130, this coil being connected, via lines 168, 170 and a three-way valve 172, to the line 104, and serving the purpose of warming up the water in the storage vessel 130, by means of a partial flow of the heat-transfer medium from the outflow line 104 from the heat source 102, to an extent such that the temperature in the storage vessel 130 is somewhat higher than in the heat-exchanger coil 142. Since the valve 128 is closed during the operation of discharging the storage device, that is to say during the generation of useful heat, the pressure which is building up in the storage vessel 130 is then sufficient to deliver the water into the evaporator 136 without aid from the pump 134, so that a regulating valve can be employed in place of the pump 134. In this case, the heat-exchanger 152 can also be dispensed with. If the heat source 102 delivers steam as the heat-transfer medium, it is advantageous to use only the superheat of the steam in the heat-exchanger coil 166, so that almost saturated steam, or wet steam, is fed to the heat-exchanger coil 142. The three-way valve 172 shuts off the line 168 during the charging operation (if desired, the line 170 can also contain a shut-off valve (not shown)), whilst during the discharging operation the three-way valve is set in such a manner that a desired portion of the flow of heat-transfer medium from the heat source 102 flows through the heat-exchanger coil 166.

For safety reasons, it can sometimes be expedient to feed only steam to the heat-exchanger coil 112. If therefore the heat source 102 is delivering waste steam of a steam power station as the heat-transfer medium, the heat-exchanger coils 112 and/or 142 operate as condensers. In this case, to prevent mixing of the power station circuit with the remote-heating supply circuit, it is then better to abstract the useful heat via the heat-exchanger coil 116 (possibly also as steam). If the waste gases of a gas turbine or of an engine are employed as a heat-transfer medium from the heat source, cooling of these gases occurs in the heat-exchanger coils 112 and 142. Alternatively, waste gases of this kind can also be employed for generating steam in a waste-heat boiler, this steam then serving as a heat-transfer medium for the input heat. In this case, the evaporator 136 can then be integrated into the waste-heat boiler, that is to say the steam thus generated can be led, during the discharging operation, directly into the storage device 114, via the valve 140.

For initially removing air from the system, the storage device 114 can be connected to a vacuum pump, which is not shown, via a line 174 which is provided with a shut-off valve.

For ensuring as complete utilisation of the capacity of the storage device as possible, and in particular for evening out the temperature of the output heat or useful heat abstracted from the storage device, it is advantageous to provide the heat-exchanger coil 112 and/or 116 with several outputs, as is represented, for example, in FIG. 2. In this case, the heat-exchanger coil 112 is subdivided into three sections 112a, 112b and 112c, which can be switched into the heat-transfer medium circuit by means of lines which possess, respectively, valves 176a, 176b and 176c. The heat-transfer coil 116 can be subdivided and connected in a corresponding manner.

During the abstraction of heat, the segments of the storage device which are cooled by the connected sections 112a, 112b and 112c respectively absorb, in a preferential manner, the working-substance vapour issuing from the evaporator 136. At first, the valve 176a is opened, the valves 176b and 176c remaining closed. The water vapour is then preferentially absorbed in the segment of the storage device 114 which contains the section 112a and is cooled by the latter. As soon as the temperature of the heat-transfer medium in the section 112a falls below a predetermined minimum value, the valve 176a is closed and the valve 176b is opened. The segment of the storage device containing the section 112a is then still further discharged, but, at the same time, sufficient heat is additionally abstracted from the segment of the storage device containing the section 112b to ensure that the desired output temperature or outward-flow temperature is achieved. The valve 176b is then closed, and the valve 176c is opened. This discharge procedure is also advantageous if the storage device has not been fully charged, due, for example, to lack of time. When the working fluid is expelled during the heat-storage operation, zones having different degrees of expulsion form, the degree of expulsion being highest at the point of entry of the heat-transfer medium from the heat source 102, and lowest at the point of exit. By arranging for the heat-transfer medium to flow, during the discharging operation, in the opposite direction to the flow during the charging operation, and by discharging the storage device segment by segment, it is possible to achieve optimum utilisation of the storage device.

Two or more similar heat-storage devices can by employed in place of the heat-storage device 114, it being possible to connect these devices in parallel, in the number required for the purpose of adjusting to load-fluctuations, or to operate them, out of phase with each other, as expellers and/or absorbers, in order to achieve quasi-continuous operation of the heat-upgrading system 100.

It is commonly desired to raise the output temperature or useful temperature $T_2$ of the storage device still further. This can be achieved by means of the following measures, which can, however, also be employed in cases when the heat source 102 delivers the input heat at a level which is too low to enable the desired useful-heat temperature level $T_2$ to be achieved. The measures described in the following text thus serve to enlarge the difference between the temperature $T_1$, during the operation of charging the storage device, and the temperature $T_2$ during the operation of discharging the storage device.

First of all, the temperature level of the useful heat can be raised by means of the compressor 154, which serves to increase the pressure of the working fluid (for example water vapour) which is generated in the evaporator 136, and thereby to raise the temperature level of the useful heat which is generated during the absorption process. Moreover, such a compressor can also serve, at a given useful-heat temperature level, to increase the range of vapour absorption (concentration width) and hence the utilisation and the efficiency of the storage device 114. The term "range of vapour absorption" is to be understood as the difference between the concentrations of absorbed working fluid, such as water, in the zeolite, in the charged condition and in the discharged condition.

A further measure for enlarging the difference between $T_2$ and $T_1$ is represented in FIG. 3, which shows a modified portion of the installation according to FIG. 1. Identical parts are provided with identical reference numbers. Here a compression heat pump 180 for raising the pressure level and the temperature level in the evaporator 136 and for increasing the range of vapour absorption in the zeolite in the generator/absorber 114 is connected in between the heat-transfer circuit of the heat source 102 and the evaporator 136. The compression heat pump 180 contains an evaporator 182, which is supplied with heat from the heat source 102 by means of the heat-transfer medium. The pressure of the evaporated working substance of the compressor heat pump is increased by means of a compressor 185, and the working fluid condenses in the heating coil 142 of the evaporator 136, which thus also operates as the condenser of the compressor heat pump. The condensed working substance is returned again to the evaporator 182 by means of a throttle valve 184.

The evaporation temperature in the evaporator 136 and the expulsion temperature in the storage device 114 can also be raised by connecting a compressor heat pump downstream of the heat source 102, the condenser-heat of this compressor heat pump then serving both the evaporator 136 and the heating coil or heat-exchanger coil 112 with higher-grade heat (not shown).

In the case of the installation represented in FIG. 4, a heat-upgrading system 200, operating continuously, is connected upstream of the heat-upgrading system 100, operating intermittently, in order to raise the temperature level of the useful heat or of the output heat of the heat-storage device 114. This comprises an expeller or generator 214a, a condenser 222, a pump 234, an evaporator 236 and an absorber 214b. In addition, a circuit 286 for the absorbing medium is provided, this circuit containing a pressure-reducing device 288 and a pump 290.

The heat-upgrading system 200 is a known installation and is represented only diagrammatically, the usual heat-exchangers, such as the exchanger between depleted and concentrated solutions in the circuit for the heat-absorbing medium, being, for example, omitted. This heat-upgrading system can, for example, operate with the working fluid systems $NH_3/H_2O$; $NH_3/H_2O/LiBr$; $NH_3/H_2O/C_4H_{10}$; $LiBr/H_2O$; $LiBr/CH_3OH$. The heat of absorption is abstracted from the absorber 214b via a heat-exchanger coil 216 and via a heat-transfer circuit, which contains a line 204, a heat-exchanger 292 for abstracting useful heat, which is connected into this line, the heating coil 112 for the storage device 114, a storage vessel 207 and a pump 209. Furthermore, the components of the heat-upgrading system which operates intermittently are marked with the same reference numbers as in FIG. 1.

During the charging operation, heat Q ($T_1$) from the heat source 102 (not shown in FIG. 4) is fed into the expeller 214a and into the evaporator 236. Waste heat Q ($T_0$) at the temperature level $T_0$ is led off to the environment from the condenser 222. Useful heat Q ($T_2$), at the temperature level $T_2$ is generated in the absorber 214b. The heat Q ($T_2$) is abstracted via the heat-exchanger coil 216 and is fed into the storage device 114 via the heat-exchanger coil 112, as has been explained with the aid of FIG. 1. If desired, useful heat having the temperature level $T_2$ can also be abstracted from the heat-exchanger 292, via a heat-exchanger coil 294.

The waste heat generated in the condenser 122 and the waste heat generated in the condenser 222 can be led off to the environment via a common cooling tower or via a common cooling installation employing river water, or the like. Following completion of the expulsion step in the storage device 114, the absorption of the expelled working fluid in the generator/absorber 114 and the abstraction of the useful heat generated in this process is carried out as described with the aid of FIG. 1. In this operation, the evaporation heat for the evaporator 136 is abstracted from the heat source, which is not shown in FIG. 4 (102 in FIG. 1). Overall, there thus results, for the useful heat which is abstracted, for example via the heat-exchanger coil 116, a temperature level $T_3$ which is above $T_2$. The overall theoretical efficiency of the installation is approximately $\frac{1}{3}$, that is to say approximately a third of the total quantity of heat, which is fed to the devices 214a, 236 and 136 at the temperature level $T_1$, can be abstracted as useful heat at the temperature level $T_3$.

Typical examples of the temperatures mentioned are: $T_0=20°$ C.; $T_1=65°$ C.; $T_2=100°$ C.; $T_3=150°$ C.

The temperature level $T_3$ of the useful heat which can be abstracted from the storage device 114 can be raised further by feeding the evaporator 136 with heat Q ($T_2$) from the absorber 214b, and not with heat Q ($T_1$) at the temperature $T_1$ from the heat source 102. For this purpose, the installation according to FIG. 4 can be modified to the form represented in FIG. 5. The heat-upgrading system 100 on the right-hand side of FIG. 5 is represented only partially and is in other respects designed in accordance with FIG. 1. The heat-transfer medium from the heat-exchanger coil 216 is therefore led, via the lines 144 and 148, through the heating coil 142 of the evaporator 136, as has been explained with the aid of FIG. 1. By means of the system arrangement according to FIG. 5, the temperature level $T_3$ of useful heat Q ($T_3$) which can be abstracted from the storage device 114 is raised still further, but the theoretical efficiency is reduced to approximately $\frac{1}{4}$.

In the case of the installation according to FIG. 5, the heat-exchanger coil 294 and the heat-exchanger coil 116 (FIG. 1) can be connected in series, this being advantageous if the useful heat is being used to heat a liquid heat-transfer medium, such as, for example, water, from a temperature which is below $T_2$, to the temperature $T_3$ (output temperature of the heat storage device 114).

If water vapour is employed in the heat-exchanger coil 112 as the heat-transfer medium for heat-transfer in the storage device 114, the evaporator 136 (FIGS. 1 and 5) of the intermittently operating heat pump of the heat-upgrading system 100 can be integrated into the absorber 214b (FIG. 4) of the continuously operating heat pump of the heat-upgrading system 200. An advantageous installation of this type is represented in FIG. 6, in which the intermittently operating heat-upgrading system corresponds to the heat-upgrading system 100 in FIGS. 1 and 5 and the continuously operating heat-upgrading system are respectively marked 300 and 400. Parts having the same functions are marked with the same reference numbers in FIGS. 1, 5 and 6. The output side of the heat-exchanger coil 216 is connected, via a valve 611, to a line 204, which contains a further valve 613 and leads to the input side of the heating coil or heat-exchanger coil 112 of the storage device 114. The working fluid input line 138, which contains the valve 140 (and, if desired, the compressor 154), branches off between the valves 611 and 613.

The output side of the valve 128 is connected to a first storage vessel 130a, the outlet of this vessel being connected via a valve 615 and a line 617 to a second storage vessel 130b, into which the output line 106 of the heat-exchanger coil 112 also opens.

The heat-exchanger 292 is connected, on one input side, to the output side of the heat-exchanger coil 216, via a valve 619, and is connected on its output side to the line 617.

The heat which is generated in the absorber 214b of the continuous heat-upgrading system 400 is employed, on the one hand, for expelling the water vapour from the zeolite contained in the storage device 114, via the heat-exchanger coil 112, and, on the other hand, for generating water vapour for the purpose of absorbing and generating useful heat in the storage device 114. The valve settings and temperatures of the various units of the installation according to FIG. 6 are summarised in Table 2. The heat-exchanger 292 enables useful heat to be abstracted at the temperature level of the absorber 214b.

There are two different modes of operation for the installation according to FIG. 6, these modes differing on account of dissimilar efficiency-ratings and different temperatures of the useful heat which can be abstracted from the storage device 114. It is possible to select the degassing pressure so that the waste heat occurs in the condenser 122 at a temperature which is so high that this heat is still suitable for feeding into the evaporator 236 and/or into the expeller 214a, under which conditions a theoretical efficiency-rating of $\frac{1}{3}$ results. During the charging phase of the storage device 114, heat from both the condenser 122, at the temperature level $T_1'$, and from the heat source 102, at the temperature level $T_1$, is therefore fed into the evaporator 236 and/or into the expeller 214a. During the discharging phase, no heat is released in the condenser 122, so that the evaporator 236 and the expeller 214a can, under these conditions, obtain heat only from the heat source 102. These conditions do not apply if the storage device 114 contains a plurality of segments which operate out of phase with each other with respect to time and permit quasi-continuous operation.

If, on the other hand, the operating parameters of the storage device 114 are chosen so that the waste heat occurs in the condenser 122 at the temperature level of the environment, that is to say at the same level as in the condenser 222, a theoretical efficiency-rating of $\frac{1}{4}$ results, whilst the level of the useful heat $T_4$ in the storage device 144 or in the heat-exchanger coil 116 is at the same time higher.

Useful heat at the temperature level of the absorber 214b can be extracted from the heat-exchanger 292, via the heat-exchanger coil 294; the heat-exchanger coil 294 can also be connected upstream of the heat-exchanger coil 116.

The valve 615 is necessary because the storage vessel 130b is at a higher pressure, during the expulsion step, than the condensate from the condenser 122 in the storage container 130a. In contrast to the operation of the installation according to FIG. 4, the continuous heat-upgrading system 200, or 400, is in operation during both the expulsion cycle and the absorption cycle of the storage device 114 in the case of the installations according to FIGS. 5 and 6.

FIG. 7 shows an installation which contains a combination of a heat-upgrading system, operating intermittently, with a heat-upgrading system, also operating intermittently, which is connected upstream of the former system, the condenser 124 and the evaporator 136 of the two heat-upgrading systems being common.

In principle, the installation according to FIG. 7 thus contains two heat-upgrading systems, operating intermittently and connected in series, of the type described with the aid of FIG. 1, and the same reference numbers as in FIG. 1 have accordingly also been used. Where instead of one component in FIG. 1 two have to be used in FIG. 7, one or two dashes are added to the relevant reference numbers. The same applies in the case of components which are required for each of the two heat-upgrading systems. Valves marked 196a and 196b enable the storage devices 114' or 114" to be charged or discharged, section by section, as explained with the aid of FIG. 2.

The process conditions for two modes of operation having different efficiency-ratings $\eta = \frac{1}{3}$ and $\frac{1}{4}$, and dissimilar useful heat levels $T_3$ and $T_4$, are summarised in Table 3, this table consisting of two partial tables 3a and 3b.

The storage device 114' is first charged by means of heat from the heat source 102, having the temperature $T_1$, via the heat-exchanger coil 112'. Working-substance vapour is then generated by evaporation in the evaporator 136, by means of heat from the heat source 102, this working-substance vapour being used to discharge the heat-storage device 114'. The heat which is generated during the process of absorption of the working substance in the absorption substance in the storage device 114' is extracted via the heat-exchanger coil 116' and is fed to the heat-exchanger coil 112" of the storage device 114", where the heat is used in expelling the working substance from the absorption substance contained in the heat-storage device 114".

For the case in which $\eta = \frac{1}{3}$, the evaporation process in the evaporator 136 is effected by heat from the heat source 102, for the purpose of generating the useful heat in the storage device 114". For the case in which $\eta = \frac{1}{4}$, the expulsion step in the storage device 114" is effected by only part of the quantity of absorption heat generated in the storage device 114', whilst the remaining heat from the storage device 114' is employed for the evaporation in the evaporator 136. In this case, the heat for the evaporator 136 is abstracted via a heat-transfer circuit, which contains the heat-exchanger coil 112' and the pump 134". An additional valve 101 is provided in the line 104 in order to shut off this heat-transfer circuit with respect to the heat source 102. Since a higher temperature level prevails in the heat-storage device 114', during the absorption step, than in the heat source 102, the pressure in the evaporator 136 and hence the useful heat level during the absorption step in the heat storage device 114" are further raised, but at the expense of the efficiency.

Silica gel and water can be employed as the absorption substance and working fluid respectively in the storage device 114' and zeolite/H$_2$O can be employed in the storage device 114". In addition, it is possible to operate with the combination of zeolite and H$_2$O in both storage devices, when (a) either different zeolites are employed in the storage devices 114' and 114", that is to say a zeolite exhibiting a relatively wide concentration width in the vicinity of the water-vapour pressure curve is employed in the storage device 114', and a zeolite exhibiting a wide concentration width over a temperature range which, seen from the water-vapour pressure curve, is located at the highest possible temperatures, (b) or one and the same zeolite is employed in the storage devices 114' and 114", the zeolite in the storage device 114' being operated in a range over which the charging with H$_2$O is relatively high and the zeolite in the storage device 114" being operated in a range over which the charging with H$_2$O is relatively low.

Zeolites of the types A, X and Y have proved particularly suitable.

TABLE 1

(refers to FIG. 1)

| Components → | Valve settings | | | | | | | | | Pumps | | | Temperatures | | | | |
|---|---|---|---|---|---|---|---|---|---|---|---|---|---|---|---|---|---|
| Operations ↓ | 108 | 110 | 120 | 128 | 140 | 146 | 150 | 158 | 162 | 109 | 134 | 164 | 102 | 114 | 122 | 130 | 136 |
| Charging the storage device | O | O | O | O | — | — | — | — | — | O | — | — | $T_1$ | $T_1$ | $T_0$ | $T_0$ | * |
| Discharging ( ) with 172 open | — | — | — | — | O | O | O | O | O | O | O | O | $T_1$ | $T_2$ | $T_0$ | $T_0$ ($T_1$) | $T_1$ |

| Components → | Pressures | | | | |
|---|---|---|---|---|---|
| Operations ↓ | 112 | 114 | 122 | 130 | 136 |
| Charging the storage | $P_1$ | $P_0$ | $P_0$ | $P_0$ | * |

TABLE 1-continued (refers to FIG. 1)

|  | device Discharging ( ) with 172 open | $P_2$ | $P_1$ | $P_0$ | $P_0$ ($P_1$) | $P_1$ |
| --- | --- | --- | --- | --- | --- | --- |

Example 1:#
$T_0 = 5°$ C.        $P_0 = 0.01$ bar
$T_1 = 100°$ C.     $P_1 = 1$ bar
$T_2 = 200-100°$ C.   $P_2 = 1-20$ bars
for the working-substance system zeolite/$H_2O$
and for $H_2O$ as the heat-transfer medium
for the useful heat (both examples)

Example 2:#
$T_0 = 45°$ C.       $P_0 = 0.1$ bar
$T_1 = 150°$ C.     $P_1 = 5$ bar
$T_2 = 270-150°$ C.   $P_2 = 5-70$ bars $T_0 < T_1 < T_2$
$P_0 < P_1$
O = valve open, or pump on
— = valve closed, or pump off
* = not in operation
(approximate values!)

TABLE 2

(refers to FIG. 6)

| Components → | | Valve settings | | | | | | | Pressures | | |
| --- | --- | --- | --- | --- | --- | --- | --- | --- | --- | --- | --- |
| Operations | | 120 | 128 | 140 | 611 | 613 | 615 | 619 | 114 | 122 | 216 |
| Operating mode | $\eta = \frac{1}{4}$ | | | | | | | | $P_0$ | $P_0$ | $P_2$ |
| Charging | | O | O | — | O | O | — | — | | | |
| Operating mode | $\eta = \frac{1}{3}$ | | | | | | | | $P'_1$ | $P'_1$ | $P_2$ |
| Operating mode | $\eta = \frac{1}{4}$ | | | | | | | | $P_2$ | * | $P_2$ |
| Discharging | | — | — | O | O | — | O | — | | | |
| Operating mode | $\eta = \frac{1}{3}$ | | | | | | | | $P_2$ | * | $P_2$ |

| Components → | | Temperatures | | | | | | | |
| --- | --- | --- | --- | --- | --- | --- | --- | --- | --- |
| Operations | | 114 | 122 | 130a | 130b | 214a | 214b | 222 | 236 | 102 |
| Operating mode Charging | $\eta = \frac{1}{4}$ | $T_2$ | $T_0$ | $T_0$ | $T_2$ | $T_1$ | $T_2$ | $T_0$ | $T_1$ | $T_1$ |
| Operating mode | $\eta = \frac{1}{3}$ | $T_2$ | $T'_1$ | $T'_1$ | $T_2$ | $T'_1, T_1$ | $T_2$ | $T_0$ | $T'_1, T_1$ | $T_1$ |
| Operating mode Discharging | $\eta = \frac{1}{4}$ | $T_4$ | * | * | $T_2$ | $T_1$ | $T_2$ | $T_0$ | $T_1$ | $T_1$ |
| Operating mode | $\eta = \frac{1}{3}$ | $T_3$ | * | * | $T_2$ | $T_1$ | $T_2$ | $T_0$ | $T_1$ | $T_1$ |

Example
(approximate
values)

$T_0 = 20°$ C.       $P_0 = 0.03$ bar
$T_1 = 65°$ C.       $P_1 = 0.2$ bar
$T_2 = 100°$ C.     $P_2 = 1$ bar
$T_3 = 150-130°$ C.
$T_4 = 180-140°$ C.

$T_0 < T_1 < T_1 < T_3 < T_4$; $T'_1 \simeq T_1$; $P'_1 \simeq P_1$
$P_0 < P_1 < P_2$
o = open
— = closed
* = not in operation

TABLE 3a (refers to FIG. 7)

| Operation FIG. 7 | Components → | Valve settings | | | | | | | | | | | | |
| --- | --- | --- | --- | --- | --- | --- | --- | --- | --- | --- | --- | --- | --- | --- |
| | | 101 | 110 | 150 | 108 | 140' | 140" | 120' | 120" | 128 | 146 | 176a | 176b | 196a | 196b |
| $\eta = \frac{1}{3}$ 1 | Expelling in 114' | O | O | — | O | — | — | O | — | O | — | — | O | — | — |
| 2 | Absorbing in 114' Expelling in 114" | O | — | O | — | O | — | — | O | O | O | — | — | — | O |
| 3 | Absorbing in 114" (Heat abstraction from 116") | O | — | O | — | — | O | — | — | — | O | — | — | — | — |
| 3 + 1 | Absorbing in 114" and Expelling in 114' | O | O | O | O | — | O | O | — | O | O | — | O | — | — |
| $\eta = \frac{1}{4}$ 1 | Expelling in 114' | O | O | — | O | — | — | O | — | O | — | — | O | — | — |
| 2 | Absorbing in 114' (partial absorption) Expelling in 114" | O | — | O | — | O | — | — | O | O | O | — | — | O | — |
| 3 | Absorbing in 114" (Heat for 136, from | — | — | — | O | O | O | — | — | — | O | O | O | — | — |

TABLE 3a-continued
(refers to FIG. 7)

114' by means of
additional absorption
in 114'.) Abstraction
of heat from 114"
via 116"

|  |  | Operation FIG. 7 | Components → | Pumps | | | | |
|---|---|---|---|---|---|---|---|---|
|  |  | | | 109' | 109" | 134' | 134" | 135 |
| $\eta = \frac{1}{3}$ | 1 | Expelling in 114' | | O | — | — | Ov | — |
|  | 2 | Absorbing in 114' Expelling in 114" | | O | O | O | — | — |
|  | 3 | Absorbing in 114" (Heat abstraction from 116") | | O | — | O | — | O |
|  | 3 + 1 | Absorbing in 114" and Expelling in 114' | | O | — | O | Og | O |
| $\eta = \frac{1}{4}$ | 1 | Expelling in 114' | | O | — | — | Ov | — |
|  | 2 | Absorbing in 114' (partial absorption) Expelling in 114" | | O | O | O | — | — |
|  | 3 | Absorbing in 114" (Heat for 136, from 114' by means of additional absorption in 114'.) Abstraction of heat from 114" via 116" | | — | — | O | Or | O |

O = valve open, or pump on
— = valve closed, or pump off
v = pump operating in forward direction
r = pump operating in reverse direction
g = pump operating in forward direction under control
*not in operation TABLE 3b
(refers to FIG. 7)

|  |  | Operation | Temperatures | | | | | Pressures | | | |
|---|---|---|---|---|---|---|---|---|---|---|---|
|  |  | | 102 | 114' | 114" | 124 | 136 | 114" | 124 | 136 | 114' |
| $\eta = \frac{1}{3}$ | 1 | Expelling in 114' | $T_1$ | $T_1$ | * | $T_0$ | * | * | $P_0$ | * | $P_0$ |
|  | 2 | Absorbing in 114' Expelling in 114" | $T_1$ | $T_2$ | $T_2$ | $T_0$ | $T_1$ | $P_0$ | $P_0$ | $P_1$ | $P_1$ |
|  | 3 | Absorbing in 114" Heat abstraction from 116" | $T_1$ | * | $T_3$ | * | $T_1$ | $P_1$ | * | $P_1$ | * |
|  | 3 + 1 | Absorbing in 114" and Expelling in 114' | $T_1$ | $T_1$ | $T_3$ | $T_0$ | $T_1$ | $P_1$ | $P_0$ | $P_1$ | $P_0$ |
| $\eta = \frac{1}{4}$ | 1 | Expelling in 114' | $T_1$ | $T_1$ | * | $T_0$ | * | * | $P_0$ | * | $P_0$ |
|  | 2 | Absorbing in 114' Expelling in 114" | $T_1$ | $T_2$ | $T_2$ | $T_0$ | $T_1$ | $P_0$ | $P_0$ | $P_1$ | $P_1$ |
|  | 3 | Absorbing in 114" | * | $T_2$ | $T_4$ | * | $T_2$ | $P_2$ | * | $P_2$ | $P_2$ |

$T_0 < T_1 < T_2 < T_3 < T_4$
$P_0 < P_1 < P_2$

We claim:

1. A process for storing heat and for upgrading its temperature comprising the following steps:
   A. generating a working fluid by expulsion from an absorbing substance, in vapor form and within a relatively low pressure range, by applying heat at a temperature $T_1$, in an intermediate temperature range, to the absorbing substance;
   B. condensing the working fluid vapor generated in step A, while in the relatively low pressure range, at a temperature $T_0$ in a relatively low temperature range;
   C. raising the pressure of the condensed working fluid into a relatively high pressure range;
   D. evaporating the condensed working fluid, in the high pressure range, by application of heat at a temperature in the intermediate temperature range;
   E. re-absorbing the evaporated working fluid in the absorbing substance, in the high pressure range and at a temperature $T_2$ within a relatively high temperature range while generating heat of absorption; and
   F. withdrawing the heat of absorption for utilization; the working fluid being water and the absorbing substance being a zeolite;

and $T_0 < T_1 < T_2$.

2. A process according to claim 1 in which the intermediate temperature range for generation of the working fluid (step A) and evaporation of the working fluid (step D) exceeds 80° C. and is no greater than about 160° C.

3. A process according to claim 2 in which the low temperature range is about 5° C. to about 60° C.

4. A process according to claim 3 in which the high temperature range exceeds 100° C.

5. A process according to claim 4 in which the low pressure range is of the order of 0.01 to 0.1 bar and the high pressure range is of the order of 1 to 20 bar.

6. A heat transformer system for storing heat from a heat source and for upgrading its temperature, comprising:
   a main working fluid circuit around which a working fluid circulates, the circuit comprising, in sequence in the direction of flow of the working fluid:
   a generature/absorber, containing an absorbing substance for the working fluid, which functions alternately as a generator and an absorber for vaporized fluid; a condenser, connected to the outlet of the generator/absorber, for condensing the working fluid at a temperature $T_0$;
   a storage vessel for the condensed working fluid; pressurizing means for increasing the pressure of the condensed working fluid;
   and an evaporator for vaporizing the working fluid, connected to supply vaporized working fluid to the generator/absorber;
   extraction heat transfer means for extracting output heat from the generator/absorber at a temperature $T_2$;
   and principal heating means for supplying heat from the heat source to the generator/absorber at a temperature $T_1$ within an intermediate temperature range, with $T_0<T_1<T_2$, and for supplying heat from the heat source to the evaporator within the intermediate temperature range;
   the absorbing substance being a zeolite and the working fluid being water.

7. A heat transformer system according to claim 6 in which the intermediate temperature range is about 80° C. to 160° C.

8. A heat transformer system according to claim 7 in which $T_1>100°$ C.

9. A heat transformer system according to claim 6 or claim 7 in which the pressurizing means comprises a pump interposed between the storage vessel and the evaporator.

10. A heat transformer system according to claim 6 or claim 7 and further comprising storage vessel heating means for heating the condensed working fluid in the storage vessel.

11. A heat transformer system according to claim 10 in which the storage vessel heating means is a part of the principal heating means.

12. A heat transformer system according to claim 6 in which the principal heating means comprises a generator heat exchanger element associated with the generator/absorber and connected to the heat source in a heat transfer circuit through which a heat transfer medium circulates, an evaporator heat exchanger element associated with the evaporator and connected to the heat transfer circuit, and evaporator heating valve means for shutting off the connection from the heat transfer circuit to the evaporator heat exchanger element.

13. A heat transformer system according to claim 6 in which the principal heating means comprises a generator heat exchanger element associated with the generator/absorber and connected to the heat source in a first heat transfer circuit through which a heat transfer medium circulates, and further comprising transfer valve means for disconnecting the generator heat exchanger element from the heat source and connecting that element into a second heat transfer circuit comprising the extraction heat transfer means.

14. A heat transformer system according to claim 13 in which the principal heating means further comprises an evaporator heat exchanger element associated with the evaporator and connected to the first heat transfer circuit, and evaporation heating valve means for shutting off the connection from the first heat transfer circuit to the evaporator heat exchanger element.

15. A heat transformer system according to claim 12 or claim 14, and further comprising a pre-heat heat exchanger, having one heat transfer element incorporated in the working fluid inlet connection to the evaporator and a second heat transfer element incorporated in the outlet for the evaporator heat exchanger element.

16. A heat transformer system according to claim 6 in which the extraction heat transfer means comprises a series of heat exchanger element sections positioned in different locations in the generator/absorber, and individual valve connections to those heat exchanger element sections to permit selective extraction of heat from the different locations in the generator/absorber.

17. A heat transformer system according to claim 16 in which the heating means incorporates the sectionalized heat exchanger element of the extraction heat transfer means, thereby permitting selective heating of the different locations in the generator/absorber.

18. A heat transformer system according to claim 6 in which a compressor heat pump is interposed between the principal heating means and the evaporator to increase the temperature of the heat supplied to the evaporator.

19. A heat transformer system according to claim 6 in which the principal heating means comprises a heat exchanger element associated with the generator/absorber and an auxiliary heat upgrading system incorporated in a heat transfer circuit between the heat source and the heat exchanger element associated with the generator/absorber.

20. A heat transformer system according to claim 6 in which the principal heating means comprises a heat exchanger element associated with the generator/absorber, a heat exchanger element associated with the evaporator, and an auxiliary heat upgrading system incorporated in a heat transfer circuit between the heat source and the heat exchanger elements for both the generator/absorber and the evaporator.

21. A heat transformer system according to claim 20 in which the evaporator of the main working fluid circuit, which functions intermittently, forms a unit with an absorber in the auxiliary heat upgrading system.

22. A heat transformer system according to claim 19, or claim 20, or claim 21, in which the main working fluid circuit functions intermittently by alternate charging and discharging of the generator/absorber, and in which the auxiliary heat upgrading system functions continuously.

23. A heat transformer system according to claim 19, or claim 20, or claim 21, in which both the main working fluiding circuit and the auxiliary heat upgrading system function intermittently.

24. A heat transformer system according to claim 23 in which the main working fluid circuit and the auxiliary heat upgrading system include a condenser and an evaporator common to both, and valve means for connecting that condenser and evaporator alternatively to the generator/absorber of the main working fluid circuit and to a generator/absorber incorporated in the auxiliary heat upgrading system.

25. A heat transformer system according to claim 6 in which the main working fluid circuit includes a compressor interposed between the evaporator and the generator/absorber working fluid inlet.

* * * * *